Dec. 26, 1922.
W. H. MINIER.
WINDSHIELD WIPER.
FILED AUG. 2, 1920.
1,439,746
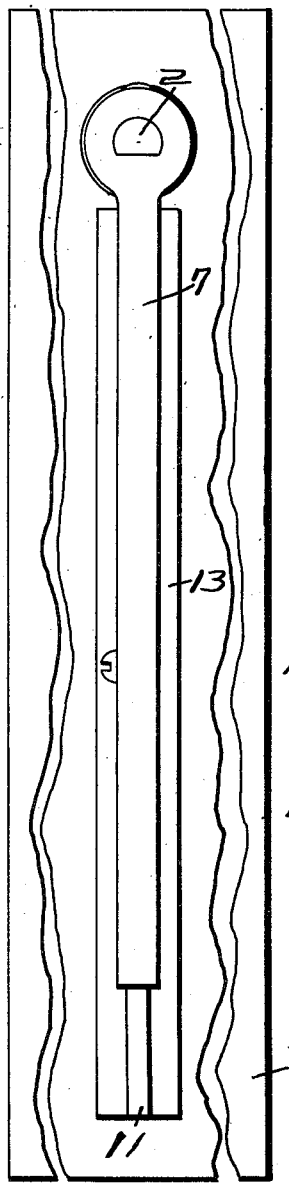
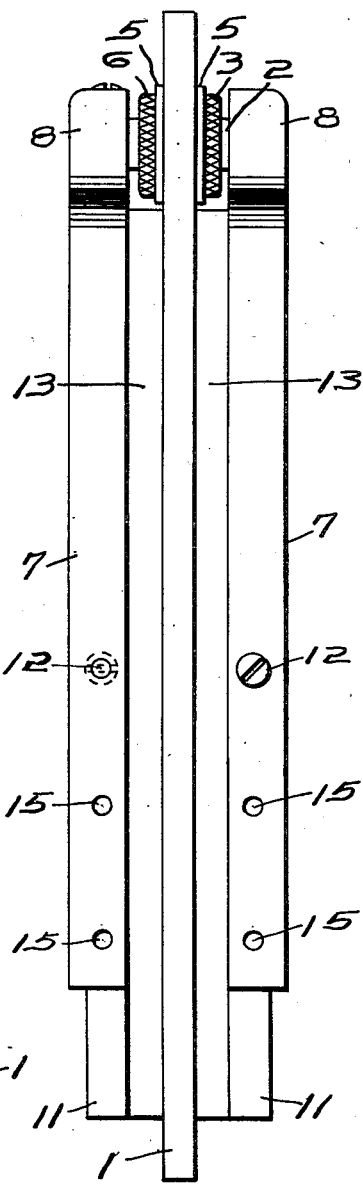
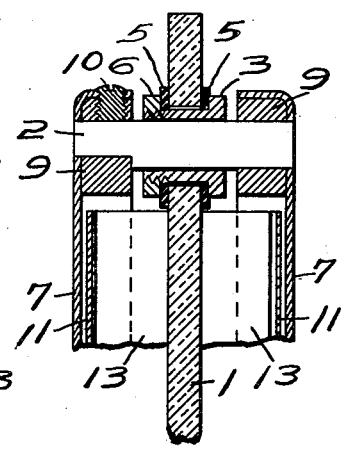
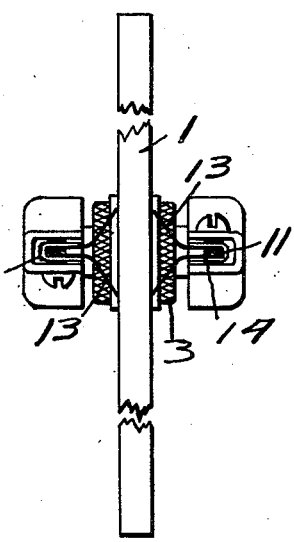
INVENTOR
William H. Minier
by
Owen Owen Crampton Patented Dec. 26, 1922.

1,439,746

UNITED STATES PATENT OFFICE.

WILLIAM H. MINIER, OF TOLEDO, OHIO, ASSIGNOR TO THE K-M MANUFACTURING COMPANY, OF TOLEDO, OHIO, A CORPORATION OF OHIO.

WINDSHIELD WIPER.

Application filed August 2, 1920. Serial No. 400,661.

*To all whom it may concern:*

Be it known that I, WILLIAM H. MINIER, a citizen of the United States, and a resident of Toledo, in the county of Lucas and State of Ohio, have made an invention appertaining to Windshield Wipers; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide an efficient glass cleaner or wiper for removing rain or cleaning the glass of snow. It particularly has for its object to provide an efficient wiper to be used in connection with an automobile wind shield or in connection with any form of conveyance having a glass or other transparent material to enable individuals within the automobile or conveyance to see through to the exterior of the conveyance.

The invention may be contained in structures of different forms. To illustrate a practical application of the invention I have selected one of such structures for the purpose of illustration and shall describe it hereinafter. The wiper selected is illustrated in the accompanying drawings.

Figure 1 of the drawings illustrates an edge view of the wiper. Fig. 2 illustrates a side view. Fig. 3 illustrates a sectional view of a part of the wiper, and Fig. 4 illustrates an end view of the wiper.

In the figures, 1 designates a glass plate, such as the glass of a wind shield. An opening may be formed in the glass plate or in the frame of the wind shield through which a pin 2 may be inserted, which holds the wiper in position on the glass 1. If desired, a suitable clamp may be formed which will allow the pin to position on the outside of the glass and of its frame in the manner well known in the art. The pin 2 passes through a bushing 3 and rubber washers 5 are located between a shoulder of the bushing on one side and a nut 6 that is screwed on to the bushing on the other side and the glass 1.

Sheet metal arms 7 are secured to the ends of the pin 2. The arms 7 may be provided with enlarged heads 8 that are secured or welded to blocks 9 located within the heads 8. One arm 7 may be secured by welding or by press fitting to one end of the pin and the other arm 7 may be secured by means of the threaded key bolt 10. If desired, one end of the pin 10 may be flattened and the arm 7 provided with an opening that will fit the flattened end of the pin 2 whereby the arm 7 may be secured to the pin 2 in such a manner as to prevent rotation of the arm 7 relative to the pin 2. Rotation of either arm 7 will thus cause a rotation of the other arm 7, the pin 2 rotating in the bushing 3.

The arms 7 are bent in the form of a channel, the edges of the channel extending toward the glass plate 1. Within the channeled arms 7 are located channeled members 11 whose edges also extend toward the glass plate. Screws 12 extend through the arms 7 and through the centers of the channeled members 11. Each channel member is provided with a wiper plate 13 formed of thin sheet metal having their central portions 14 bent to form a channel and located within the channel members 11. The channel members 11 and the channel portions 14 of the plates 13 are so formed and positioned that there is considerable play of the sides of the thin metal wipers 13. The sides of the sheet metal wipers 13 extend diagonally towards the glass plate 1. The sides of the thin plates 13 except the central portions thereof, are preferably located in sloping planes extending from the U-shaped portions of the plates to the edges of the plates, the corners of which rest on the glass plate 1.

The screws 12 also pass through the center of the wiper members 13 and thus the wiper members 13 are also secured centrally within the channel members 11 which are mounted centrally within the channel arms 7. The channel arms 7 are so located on the pin 2 and also with respect to glass 1 that the arms 7, through the screws 12, press the wiper members 13 toward each other and against the glass 1. The wiper members 13 being formed of sheet metal have a considerable elasticity and thus the arms 7 will be yieldingly pressed outward by the elasticity of the wiper member. Moreover, the wiper members being formed of sheet metal there may be a good deal of play between the arms 7 and the plate glass without materially changing the relation of the sloping portions of the wiper members relative to the glass. The channel members being held at their centers by the bolts 12 located on the arms 7, and the wiper members being forced against the glass by the arms 7, the edges of the wiper members are pressed uniformly along their lengths against the surface of the glass independent of the position of the arms 7 with respect to the glass within, of course, such limitations that the arms 7 be in position to press the wiper members against the glass.

The corners of the edges of the wiper members only press on the glass, which will, when moved sidewise, clean the glass of any snow or rain or foreign material. Also in view of the fact that the wiper members 13 are formed of single sheets and have free play in the supporting members, that is, within the channel members 11, the slanting sides thereof maintain their slanting positions to the glass and thus operate to clean the glass when the arms are rotated about the axis of the pin 2.

The arms 7 may be provided with a plurality of screw holes 15 through which the screw 12 may be inserted to secure the wiper members 13 and the channel members 11 in different positions relative to the pin 2. The channel members 11 thus telescope within the channel arms 7 and the wiper member may be secured in different positions within the arms 7 to give clear vision in different annular or arcuate cleaned spaces on the glass.

I claim:—

1. In a glass wiper, a channel arm, a flexible elastic sheet metal wiping member V-shape in cross section pivotally connected to the said arm, the portion located within the arm within the channel thereof having a width smaller than that of the inside of the channel to permit free movement of the elastic sides of the wiping member, means for pressing the arm towards the glass to flare the elastic wiping member.

2. In a glass wiper, a channelled arm, a channel member pivoted to the said arm and within the channel of the arm, an elastic flexible sheet metal wiper member supported within the channel member and having curved flaring portions along opposite side edges, the side edges being pressed towards the glass so as to contact with the glass.

In testimony whereof I have hereunto signed my name to this specification.

WILLIAM H. MINIER.